US010743715B2

United States Patent
Jennings et al.

(10) Patent No.: US 10,743,715 B2
(45) Date of Patent: Aug. 18, 2020

(54) FOOD SERVING STATION AND ASSOCIATED APPLIANCES AND METHODS

(71) Applicant: DUKE MANUFACTURING CO., St. Louis, MO (US)

(72) Inventors: Brent Jennings, Webster Groves, MO (US); James W. Bigott, Fenton, MO (US); Randy Lines, St. Louis, MO (US); David Martin, St. Louis, MO (US)

(73) Assignee: Duke Manufacturing Co., St. Louis, MO (US)

( * ) Notice: Subject to any disclaimer, the term of this patent is extended or adjusted under 35 U.S.C. 154(b) by 8 days.

(21) Appl. No.: 15/893,275

(22) Filed: Feb. 9, 2018

(65) Prior Publication Data

US 2018/0160854 A1 Jun. 14, 2018

Related U.S. Application Data

(63) Continuation of application No. PCT/IB2016/054836, filed on Aug. 10, 2016.

(60) Provisional application No. 62/203,148, filed on Aug. 10, 2015.

(51) Int. Cl.
| | |
|---|---|
| *A47J 39/00* | (2006.01) |
| *A47J 36/24* | (2006.01) |
| *A47J 37/04* | (2006.01) |
| *H05B 6/12* | (2006.01) |
| *H05B 3/76* | (2006.01) |

(52) U.S. Cl.
CPC ......... *A47J 39/006* (2013.01); *A47J 36/2483* (2013.01); *A47J 37/049* (2013.01); *H05B 3/76* (2013.01); *H05B 6/12* (2013.01)

(58) Field of Classification Search
CPC ...... A47J 39/006; A47J 36/2483; A47J 39/02; A47J 27/14; A47J 37/04; A47J 37/0786; A47J 36/2488; A47J 37/049
USPC .................. 99/331, 348, 470, 468, 483, 449
See application file for complete search history.

(56) References Cited

U.S. PATENT DOCUMENTS

| | | |
|---|---|---|
| 3,797,375 A | 3/1974 | Cerola |
| 3,797,377 A | 3/1974 | Lotter et al. |
| 3,964,378 A | 6/1976 | Dunkelman |
| 4,562,827 A | 1/1986 | Cerola |

(Continued)

FOREIGN PATENT DOCUMENTS

| | | |
|---|---|---|
| DE | 9310919.9 U1 | 8/1994 |
| DE | 102008050877 A1 | 4/2010 |

(Continued)

OTHER PUBLICATIONS

International Search Report dated Feb. 3, 2017 in related PCT application PCT/IB2016/054836, 7 pages.

(Continued)

*Primary Examiner* — Phuong T Nguyen
(74) *Attorney, Agent, or Firm* — Stinson LLP

(57) ABSTRACT

Food preparation apparatus and associated appliance modules and methods. Appliances modules can be selectively docked at docks of an appliance interface of a base. An appliance module includes a food container support surface movable between cooking and holding positions. An appliance module includes a receptacle having a holding well that can be selectively configured in a generally horizontal position or an inclined position.

19 Claims, 13 Drawing Sheets

(56) References Cited

U.S. PATENT DOCUMENTS

| | | |
|---|---|---|
| 4,910,372 A | 3/1990 | Vukich |
| 4,922,079 A | 5/1990 | Bowen et al. |
| 5,101,736 A | 4/1992 | Bommarito et al. |
| 5,386,102 A | 1/1995 | Takikawa et al. |
| 5,512,733 A | 4/1996 | Takikawa et al. |
| 5,921,096 A | 7/1999 | Warren |
| 6,089,036 A | 7/2000 | Carlson et al. |
| 6,271,504 B1 | 8/2001 | Barritt |
| 6,399,925 B1 | 6/2002 | Pickering et al. |
| 6,629,491 B1 | 10/2003 | Chan |
| 6,745,588 B2 | 6/2004 | Kahler |
| 6,769,752 B2 | 8/2004 | Hahn et al. |
| 8,104,852 B2 * | 1/2012 | Oh ................ F25D 25/025 312/310 |
| 8,171,845 B2 | 5/2012 | Hartsfield, Jr. et al. |
| 8,307,761 B1 * | 11/2012 | Shackelford ........ A47J 36/2483 99/470 |
| 8,701,554 B2 | 4/2014 | Hartsfield, Jr. et al. |
| 8,997,640 B2 | 4/2015 | Hartsfield, Jr. et al. |
| 9,016,192 B2 | 4/2015 | Frauenfeld et al. |
| 9,320,389 B2 | 4/2016 | Metz et al. |
| 2006/0174863 A1 | 8/2006 | Menegon |
| 2008/0245357 A1 | 10/2008 | Meetler et al. |
| 2011/0277644 A1 * | 11/2011 | Frauenfeld ............ A47F 10/06 99/483 |
| 2014/0339220 A1 | 11/2014 | Metz et al. |
| 2015/0034630 A1 | 2/2015 | Fuchs |

FOREIGN PATENT DOCUMENTS

| | | |
|---|---|---|
| EP | 0496247 A1 | 7/1992 |
| FR | 2662343 A1 | 11/1991 |
| JP | 2010-104481 A | 5/2010 |
| WO | 98/20776 A1 | 5/1998 |
| WO | 2006053369 A1 | 5/2006 |
| WO | 2009053653 A2 | 4/2009 |
| WO | 2014093476 A1 | 6/2014 |

OTHER PUBLICATIONS

Written Opinion dated Feb. 3, 2017 in related PCT application PCT/IB2016/054836, 16 pages.

* cited by examiner

FOOD SERVING STATION AND ASSOCIATED APPLIANCES AND METHODS

CROSS-REFERENCE TO RELATED APPLICATIONS

The present application is a continuation of PCT/IB2016/054836, filed Aug. 10, 2016, and claims priority to U.S. Provisional Patent Application No. 62/203,148, filed Aug. 10, 2015, both of which are hereby incorporated by reference in their entireties.

FIELD

The present disclosure generally relates to food preparation apparatus and methods, and more particularly to appliances and methods of using appliances for food related tasks.

BACKGROUND

Many types of apparatus are used in the preparation and serving of food. In one example, a food serving station may be arranged to have an employee side and a customer side. A plurality of appliances may be provided at the employee side for use in preparing food to be served to customers or to be stored for customer selection. For example, some such appliances include cook tops, grills, griddles, steam tables, etc. The arrangement of appliances at a food serving station can be disorganized and not provide a professional appearance from the customer side. Moreover, at various times of the day, or for different days, the employee may need different appliances for preparing different types of food.

SUMMARY

One aspect of the present invention relates to an appliance for preparing food in a food container. The appliance includes a housing including an exterior having an upper surface. The appliance includes a food conditioning mechanism including a food container support surface and at least one food conditioning element. The food conditioning mechanism is operatively connected to the housing. The food container support surface is movable with respect to the housing. The at least one food conditioning element is positioned for conditioning food in a food container when the food container is supported on the food container support surface. The food conditioning mechanism has a cooking position with respect to the housing for cooking food in a first food container supported on the food container support surface. The food container support surface in the cooking position is positioned at about the same elevation as said upper surface of the housing or higher than said upper surface of the housing. The food conditioning mechanism has a holding position with respect to the housing different than the cooking position. The food container support surface in the holding position is positioned lower than the food container support surface when in the cooking position, the housing and the food container support surface in the holding position forming a receptacle defining a food container receiving space below said upper surface for receiving a second food container for holding food in the second food container at a desired temperature.

In another aspect of the invention, a method of preparing food with an appliance includes supporting a first food container on a food container support surface. The food container support surface is located in a cooking position with respect to a housing of the appliance. The appliance is operated to cook food in the first food container while the food container is supported on the food container support surface in the cooking position. The method includes lowering the food container support surface with respect to the housing from the cooking position to a holding position to form a food container receiving space having a lower portion bounded by the food container support surface and at least one side portion bounded by the housing. The method includes positioning a second food container in the food container receiving space.

In another aspect of the invention, an appliance for holding food in a food container at a desired holding temperature includes a housing and a receptacle operatively supported by the housing. The receptacle has a food container receiving space sized for receiving a food container. A lower portion of the food container receiving space and at least one side portion of the food container receiving space are bounded by the receptacle. The receptacle includes at least one food conditioning element for holding food in the food container at a desired holding temperature when the food container is received in the food container receiving space. The receptacle is movable with respect to the housing between a generally horizontal position and an inclined position for selectively holding the food container in the generally horizontal position and the inclined position. The receptacle in the inclined position has a first end positioned higher than an opposite second end. The at least one food conditioning element is movable with the receptacle between the generally horizontal position and the inclined position.

In another aspect of the present invention, a method of holding food in an appliance at a desired holding temperature includes moving a receptacle of the appliance from a first position in a cavity of a housing to an inclined position in the cavity of the housing. The method includes positioning a food container in a food container receiving space of the receptacle. A bottom of the food container receiving space is bounded by the receptacle, and at least one side of the food container receiving space is bounded by the receptacle. The method includes operating the appliance while the food container is in the food container receiving space and the receptacle is in the inclined position to hold food in the food container at a desired holding temperature.

In yet another aspect of the present invention, an appliance apparatus for preparing food includes a base and at least first and second appliance modules. The base has an appliance module interface. The appliance module interface includes at least first and second appliance module docks. Each appliance module dock defines an appliance module docking space and includes an appliance module support surface and at least one dock utility connector. A first appliance module is docked at the first appliance module dock. The first appliance module includes a housing, a food conditioning device, and at least one appliance module utility connector. The first appliance module is supported by the support surface of the first appliance module dock. The at least one appliance module utility connector is connected to the at least one dock utility connector. A second appliance module is docked at the second appliance module dock. The second appliance module includes a housing having generally the same size and shape as the housing of the first appliance module. The second appliance module includes a food conditioning device and at least one food appliance utility connector. The second appliance module is supported by the support surface of the first appliance module dock.

The at least one appliance module utility connector is connected to the at least one dock utility connector.

Other objects and features of the present invention will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE DRAWINGS

Figure 1:
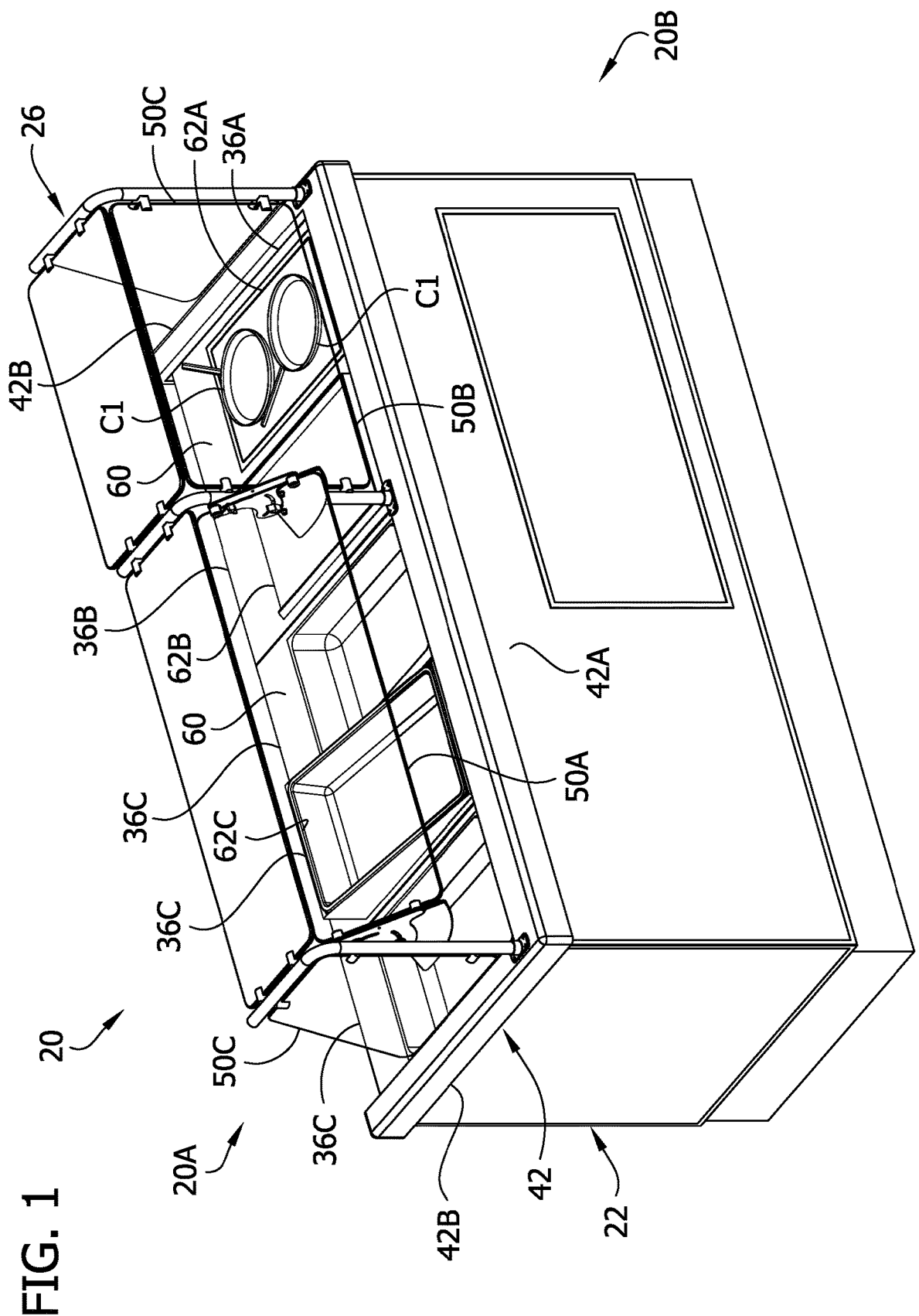
FIG. 1 is a front perspective of a food preparation apparatus embodying aspects of the present invention.

Referring to FIG. 1, a food serving station is designated generally by the reference number 20. The food serving station can be referred to broadly as a food preparation apparatus or food appliance apparatus. The food serving station 20 has a rear employee side 20A and a front customer side 20B. It is contemplated that the food serving station 20 could be used in a context in which an employee prepares food at the request of a customer and serves the food to the customer, and/or in which the employee prepares food to be displayed for later selection by a customer. As will become apparent, the food serving station 20 includes several features that make the station versatile in food preparation capabilities. As used herein, the term preparing food can include cooking food and/or holding food at a desired temperature. The food preparation apparatus 20 can take other forms without departing from the scope of the present invention.

Figure 2:
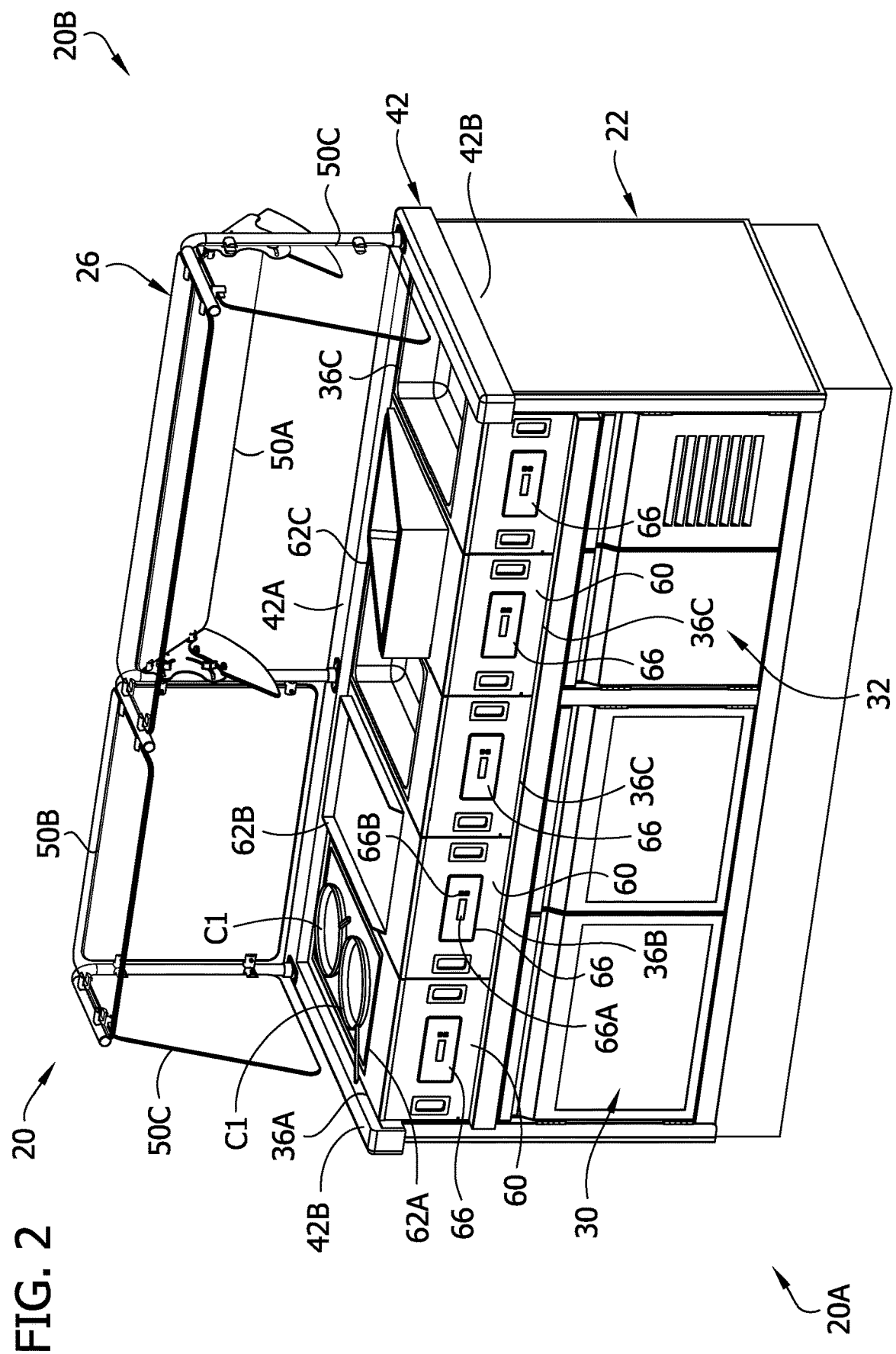
FIG. 2 is a rear perspective of the food preparation apparatus of FIG. 1.

The food serving station 20 generally includes a base 22, an appliance interface 24 (FIG. 3), and a breath guard 26. The base 22 can be referred to as a console or foundation. Referring to FIG. 2, the base 22 comprises a cabinet (also numbered 22) having a lower storage cavity 30 for storing food in a refrigerated, warmed, and/or ambient controlled environment. The cabinet 22 has another storage cavity 32 for housing a temperature control fluid bank (not shown) for supplying temperature control fluid to appliance modules at the appliance module interface 24, as described in further detail below.

Figure 3:
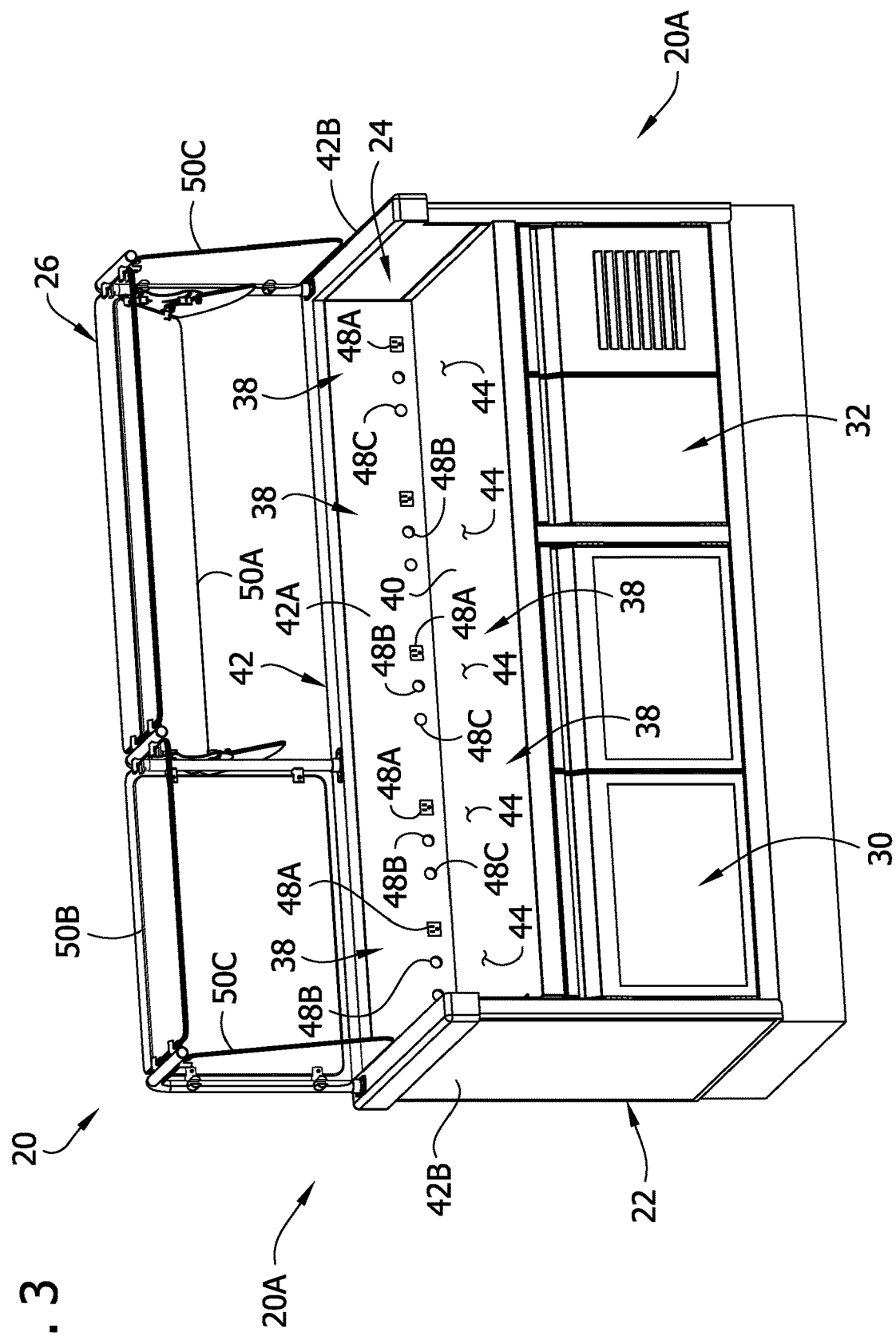
FIG. 3 is another rear perspective of the food preparation apparatus, food appliance modules being removed from appliance module docks.
Figure 4:
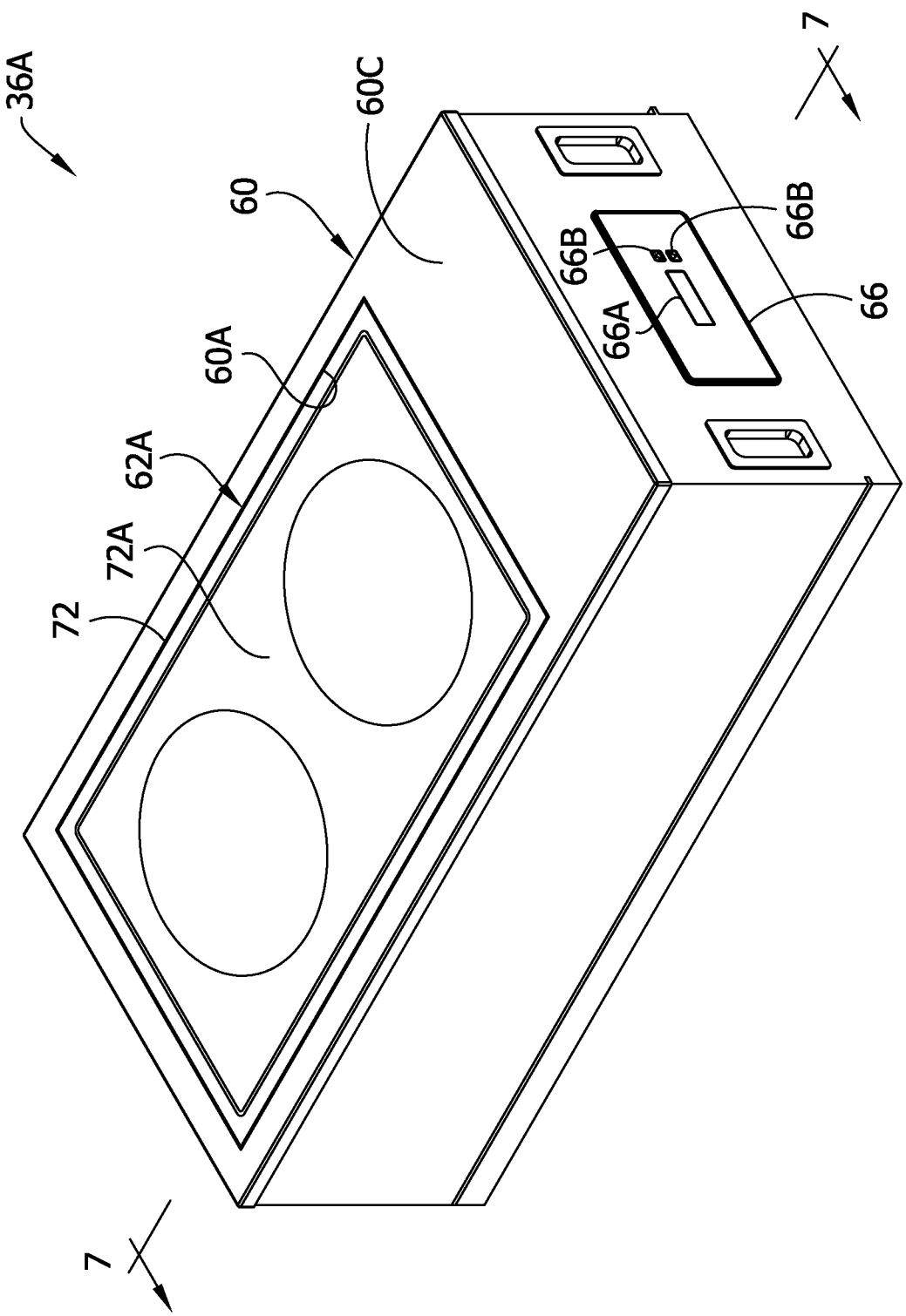
FIG. 4 is rear perspective of a food cooking/holding appliance module.

The appliance module interface 24 is configured for receiving multiple appliance modules 36 for performing a variety of food preparation tasks. The appliance module interface 24 includes multiple appliance module docks 38 (FIG. 3). In the illustrated embodiment, five appliance module docks 38 are provided. The appliance modules 36 and appliance docks 38 are modular in the sense that standard dimensions and connection components are used among the docks and modules such that any one of the appliance modules can be docked at any one of the docks to meet the employee's needs for a particular day or day part.

The illustrated appliance module interface 24 includes a countertop 40 (FIG. 3), portions of which can be referred to as appliance module support surfaces corresponding to respective docks 38. The cabinet 22 includes a shroud 42 comprising a front section 42A extending upward from the countertop across a front side of the appliance module interface 24 and side sections 42B extending upward from the countertop across opposite left and right sides of the appliance module interface. Each dock 38 includes a docking space 44 (FIG. 3) bounded by associated portions of the countertop 40 and shroud 42A, 42B. The docking spaces 44 have open tops and open rear ends. The front section 42A of the shroud can be referred to as forward portions of the base 22 associated with respective docks 38 for concealing the front sides of the docking spaces 44. Moreover, the side sections 42B of the shroud can be referred to as side portions of the base 22 associated with the end appliance module docks 38 for concealing sides of the end docking spaces 44. Desirably, the shroud sections 42A, 42B have a height about the same as the appliance modules 36 or slightly taller than the appliance modules. As shown in FIG. 1, the configuration is such that the food serving station 20 has an aesthetic appearance from the customer side 20B. The shroud 42 can have other configurations without departing from the scope of the present invention. For example, the side sections 42B can be omitted.

The appliance interface 24 includes a plurality of utility connectors 48 arranged in sets of utility connectors provided along the rear face of the front section 42A of the shroud. The sets of utility connectors 48 are spaced at intervals corresponding to each of the docks 38. In the illustrated embodiment, each set of utility connectors 48 includes an electrical power connector 48A (e.g., female socket), and first and second temperature control fluid connectors 48B, 48C (e.g., female sockets). For example, the first temperature fluid control connector 48B can be an inlet connector for receiving fluid, and the second temperature fluid connector 48C can be an outlet connector for delivering fluid. It will be appreciated that all of the temperature fluid connectors 48B, 48C can be operatively connected to the temperature fluid bank (e.g., a system including one or more suitable tanks, pumps, and/or compressors, etc.) for supplying heating and/or cooling temperature fluid (e.g., refrigerant, glycol, etc.) to appliance modules 36 at the docks 38. Desirably, the fluid connectors are quick connect/disconnect type connectors. For example, pushing the connectors together along a fluid flow axis of the connectors forms a connection having a fluid tight seal, and the connectors can be readily pulled apart for disconnection.

As is now apparent, each of the docks 38 includes an appliance module support surface 40, an appliance module docking space 44, an electrical power utility connector 48A, and first and second fluid control utility connectors 48B, 48C. The appliance modules 36 and docks 38 can have other forms without departing from the scope of the present invention. For example, other types, numbers, or combinations of utility connectors can be provided.

The breath guard 26 extends around the upper end of the cabinet 22 above the front and side sections 42A, 42B of the shroud 42. Desirably, the breath guard 26 includes one or more panels 50 of transparent or translucent material (e.g., glass or acrylic) permitting customers to see the appliance modules. In particular, the breath guard 26 includes first and second front panels 50A, 50B at the customer side extending between opposite sides of the cabinet 22 and opposite end panels 50C at the ends of the cabinet. The first front panel 50A is selectively pivotable from an inclined position (e.g., FIGS. 1 and 3) permitting customers to access food appliance modules 36 behind the first front panel to an upstanding configuration (not shown) substantially blocking customers from accessing the appliance modules behind the first front panel. In the inclined position, there is a gap below the first front panel 50A permitting customers to reach under the panel to access food in appliance modules. As will become apparent, in some cases the employee may want to display food for customers to more readily access themselves.

In the illustrated embodiment, the docked appliance modules 36 include a convertible cooking/holding appliance module 36A, a griddle appliance module 36B, and three convertible holding modules 36C. It will be appreciated that the employee may choose such an arrangement for cooking food at the cooking/holding appliance module 36A and/or the griddle appliance module 36B, and for storing food to be cooked and/or storing cooked food in the convertible food holding modules 36C. It will be understood that the same set of appliance modules 36 could be arranged in other orders along the appliance module interface 24, and the appliance modules could be replaced with other appliance modules (not shown). The appliance modules 36 can be referred to individually as appliances.

Figure 5:
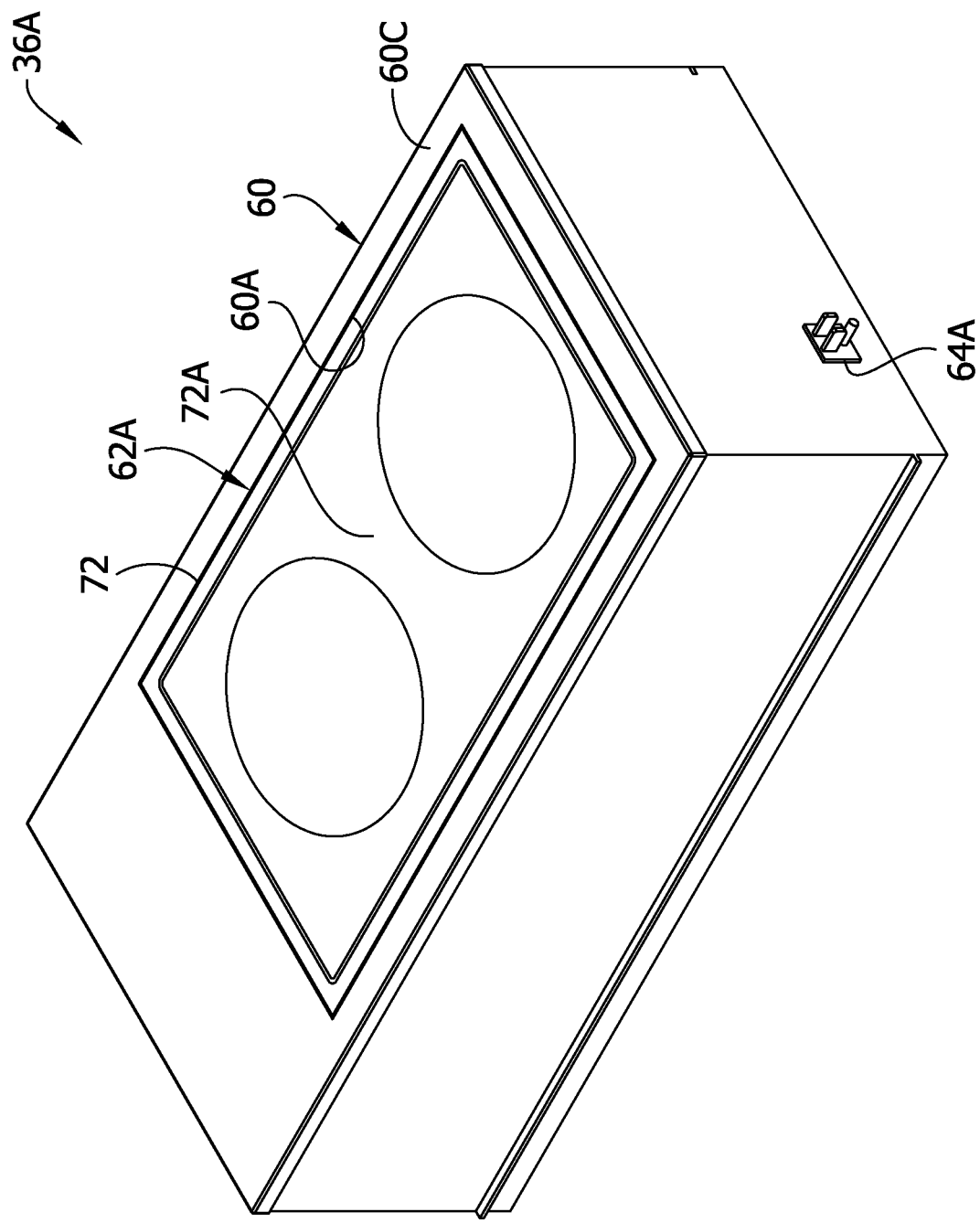
FIG. 5 is front perspective of the food cooking/holding appliance module.
Figure 10:
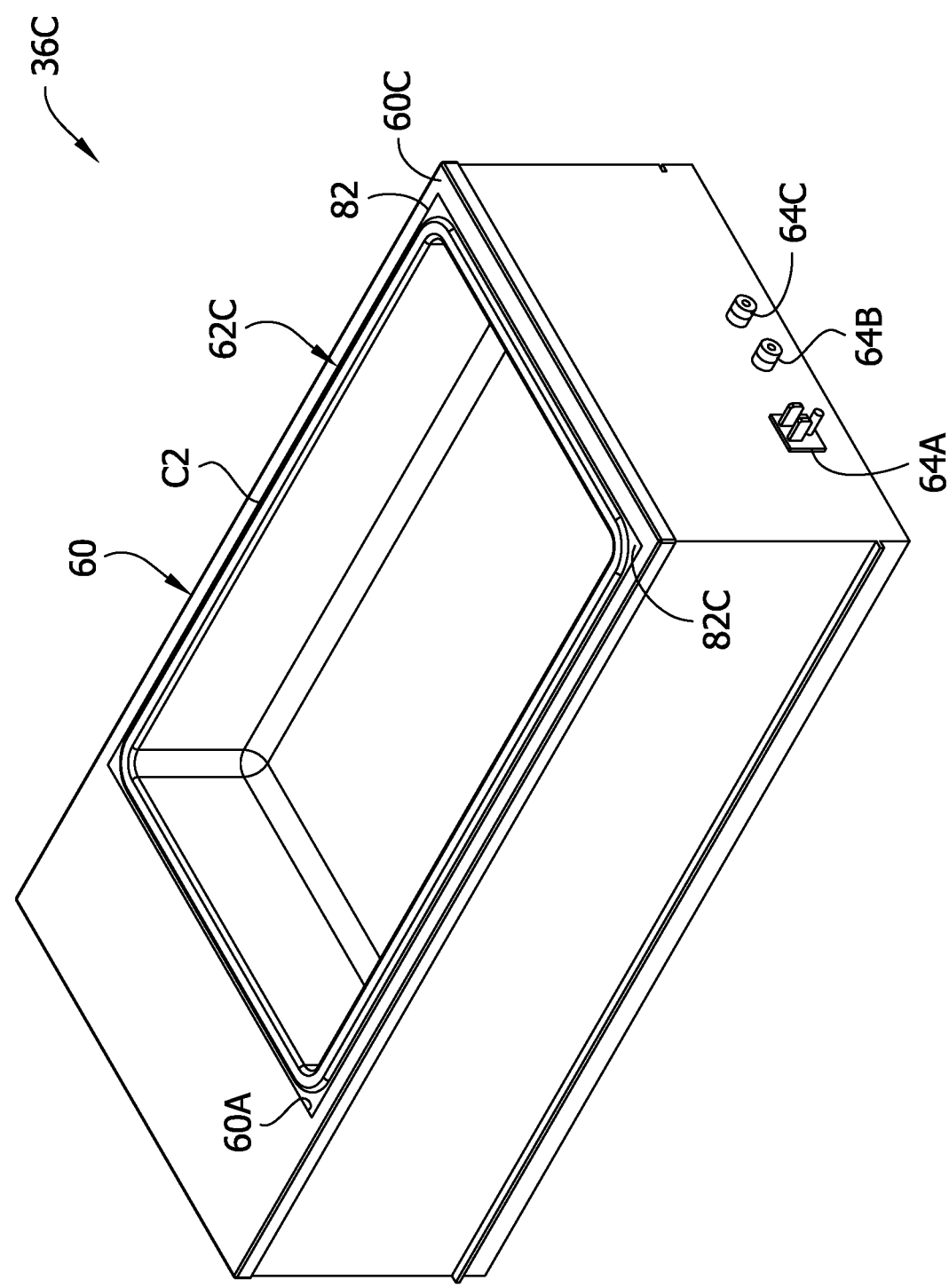
FIG. 10 is a front perspective of the holding appliance module.
Figure 11:
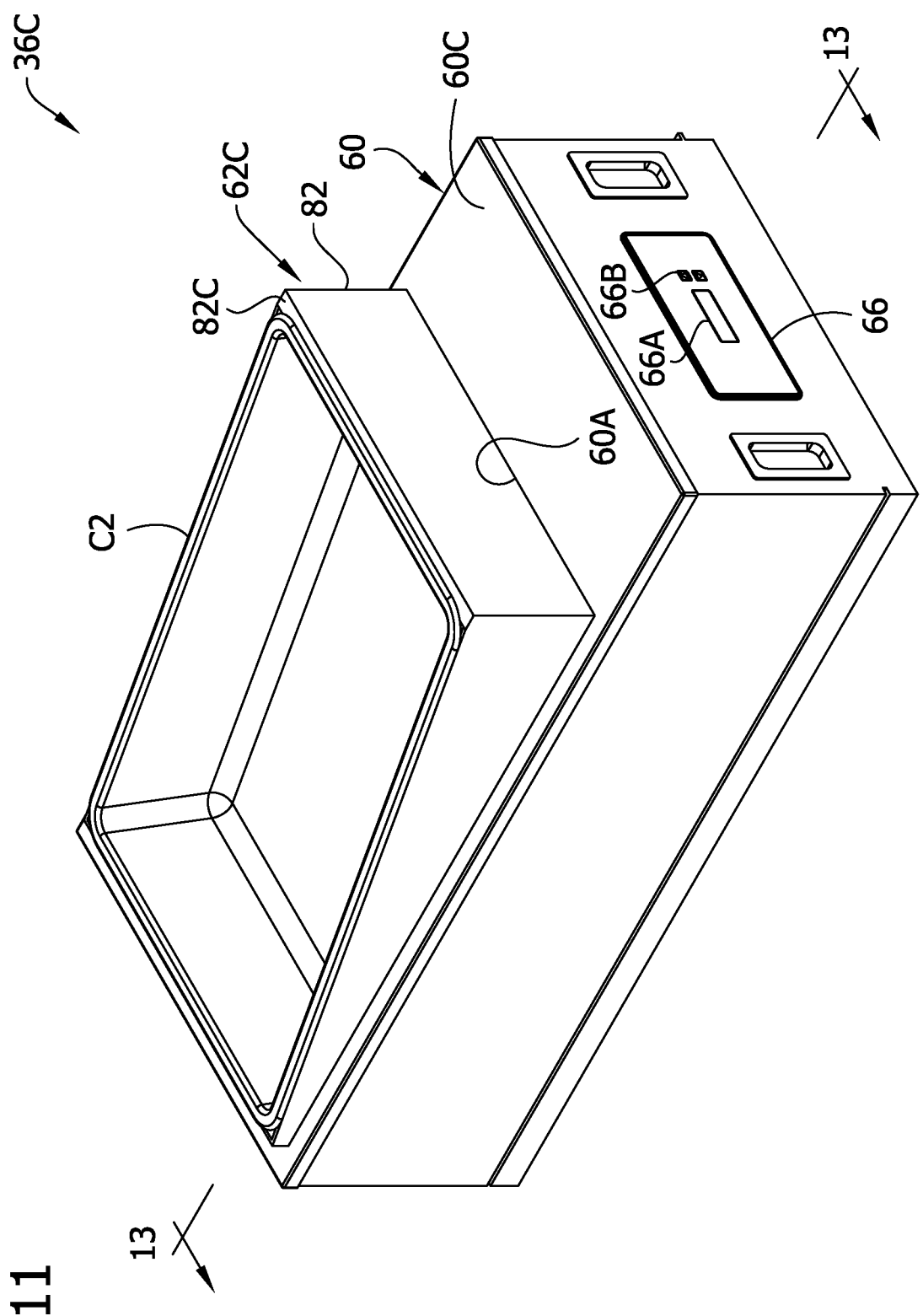
FIG. 11 is a view similar to FIG. 9 but showing a receptacle of the holding appliance module in an inclined position.
Figure 12:
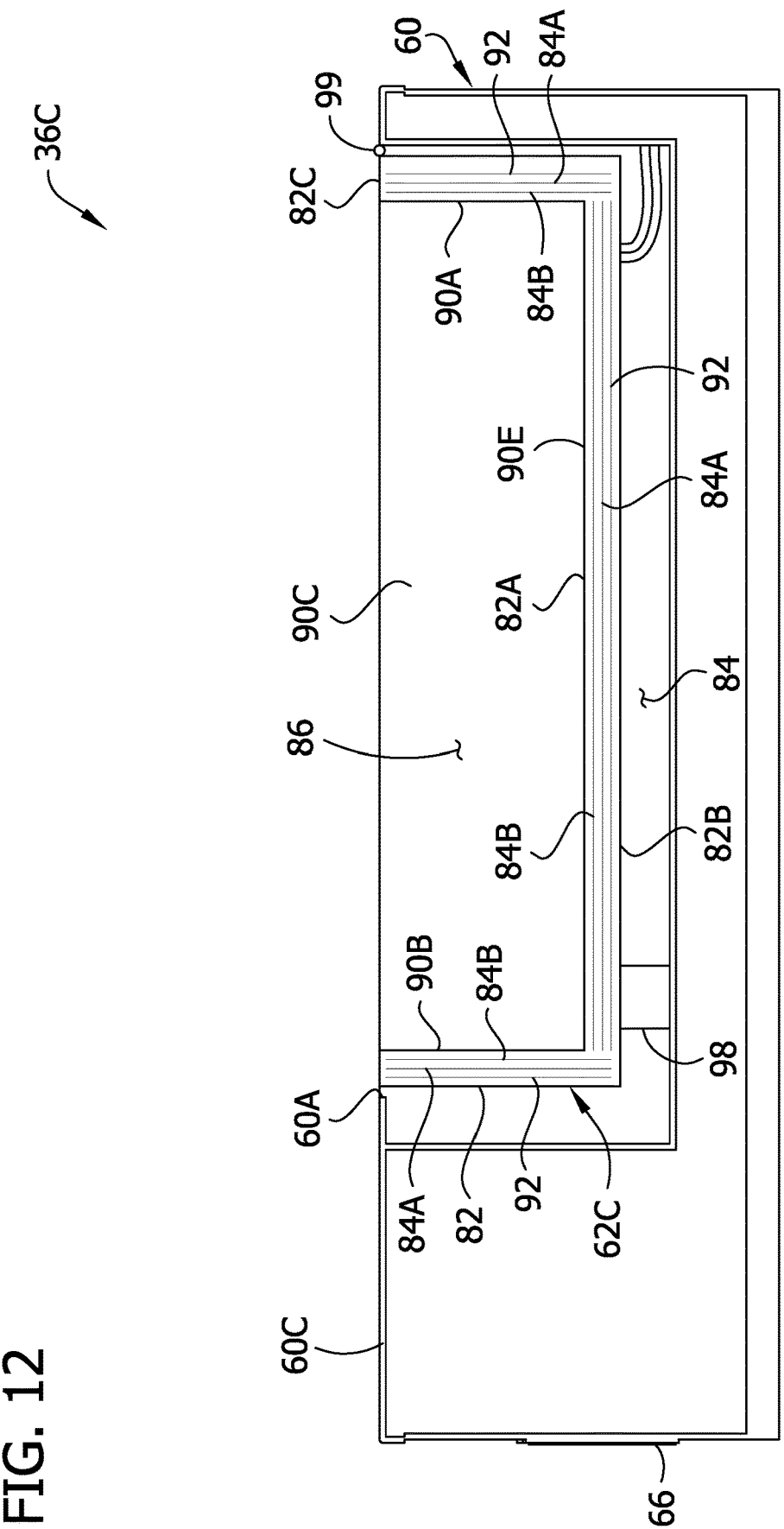
FIG. 12 is a schematic section of the appliance module taken in the plane including line 12-12 of FIG. 9.
Figure 13:
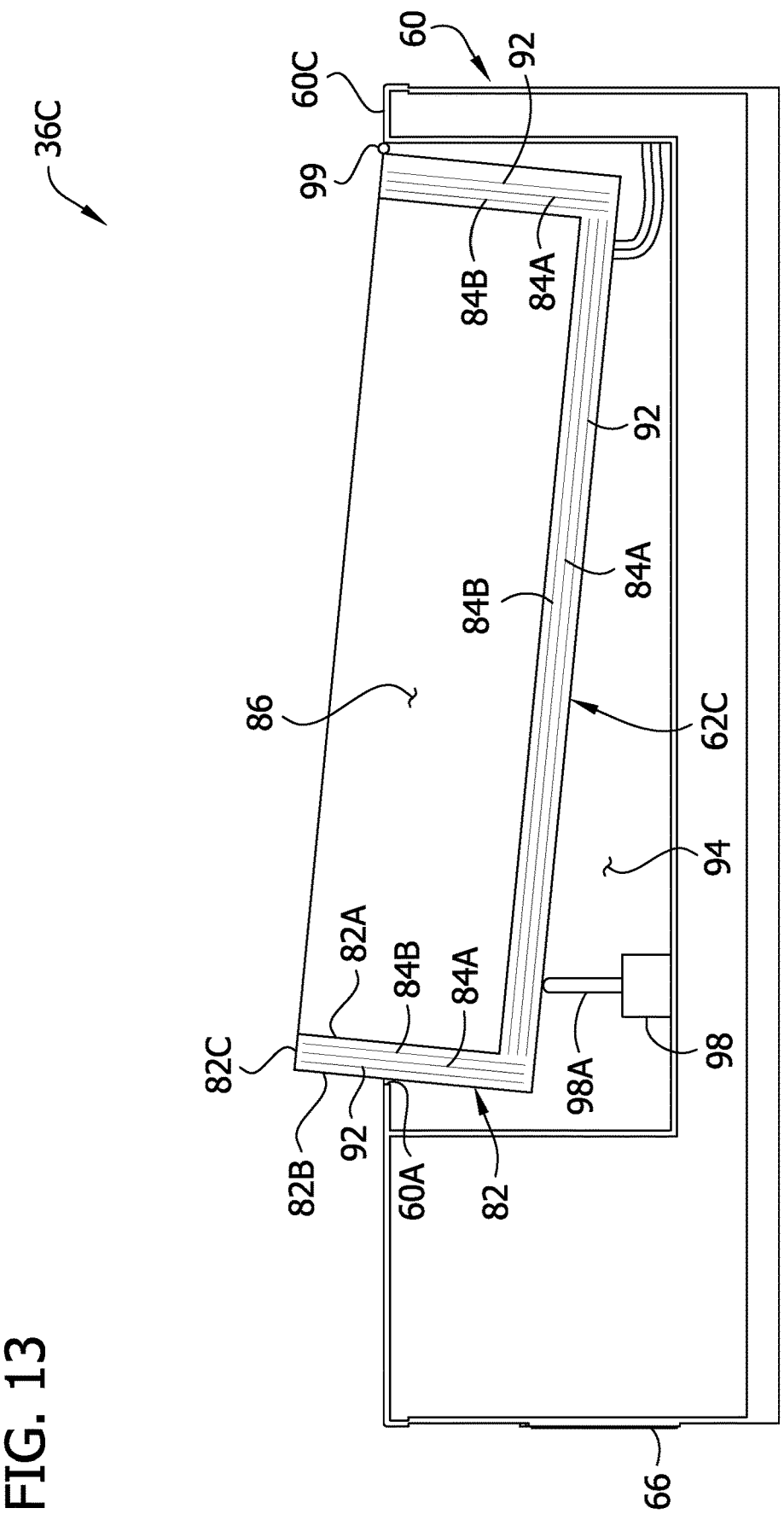
FIG. 13 is a schematic section of the appliance module taken in the plane including line 13-13 of FIG. 11.

Referring to FIGS. 1 and 2, each appliance module 36 includes a housing 60, a food conditioning device 62 (e.g., cook top device 62A, griddle device 62B, holding device 62C, etc.), and at least one appliance module utility connector 64 (FIGS. 5 and 10). The housings include top, bottom, left, right, front, and rear walls. The housings have substantially the same shape and size for modularity. Desirably, the food conditioning device 62 is arranged with respect to the housing 60 to provide an food conditioning area of the conditioning device at the top of the housing. For example, food conditioning areas of the cook top device 62A, the griddle device 62B, and holding device 62C are accessible at the top of the housings. When an appliance module 36 is docked at a dock 38, the bottom wall of the appliance module is supported on the support surface 40 of the dock. In addition, the at least one utility connector 64 of the appliance module is connected to a utility connector 48 of the dock 38. The top walls of the appliance modules 36 are positioned at about countertop height (i.e., between about 30 and 48 inches from the floor) to provide a convenient working elevation for the employee. Desirably, the top walls of the modules 36 are a short distance lower than the top of the shroud 42. The appliance modules 36 include controls 66 (FIGS. 2, 4, 6, 9), each including a display 66A and a user input 66B, mounted on the front walls of the appliance modules. The utility connectors 64 can vary for each appliance module. For example, as explained below with reference to FIGS. 4-8, some utility appliance modules may include only an electrical power utility connector 64A, and with reference to FIGS. 9-13, other utility modules may include additional utility connectors, such as fluid utility connectors 64B, 64C corresponding to the fluid connectors 48C, 48D of the docks 38. Desirably, the appliance modules 36 are plug-and-play modules in the sense that they can be readily installed at the docks 38 and used for preparing food. For example, an appliance module 36 can be supported on the support surface 40 of a dock 38 and then slid forward toward the customer side 20B to engage and operatively connect the connectors 48, 64 with each other. Other arrangements, numbers, and types of connectors, such as connectors at ends of external flexible cords, etc., can be used without departing from the scope of the present invention.

Referring now to FIGS. 4-8, the cooking/holding convertible appliance module 36A will be described in closer detail. Generally speaking, the appliance module 36A includes a housing 60, a food conditioning device in the form of a cook top 62A (broadly "food conditioning mechanism"), a control 66, and a utility connector 64A (FIG. 5). The housing 60 includes top, bottom, left, right, and front and rear walls defining an exterior of the housing. The control 66 is mounted on the rear wall of the housing. The control comprises a user interface including a display 66A and a user input 66B. The utility connector 64A comprises a male plug for mating electrical power connection with a female electrical socket 48A of an appliance module dock 38. Other types of utility connectors can be used without departing from the scope of the present invention.

The cook top 62A includes a shell 72 and a food conditioning element 74. The shell 72 has an interior in which the food conditioning element 74 is housed. The shell 72 includes an upper food container support surface 72A. In the illustrated embodiment, the food conditioning element 74 is schematically shown as a copper coil configured for induction heating of food containers supported on the food container support surface 72A. Other types of food conditioning elements (e.g., heating and/or cooling elements) can be used without departing from the scope of the present invention.

An opening 60A in the top wall of the housing 60 provides access to a cavity 60B in the housing in which the cook top 62A is movable. The top wall of the housing 60 has an upper surface 60C surrounding the opening 60A. The cook top 62A is operatively connected to the housing 60 by an actuation mechanism 78 including a scissors support 78A including two sets of legs (only one set being shown) and a linear actuator 78B having an extendable and retractable arm 78C. The linear actuator 78B moves a lower portion of one of the legs of the scissors support 78A to adjust an elevation of the cook top 62A in the cavity 60B in the housing. The arrangement is such that the cook top 62A is movable by the actuation mechanism 78 between a raised cooking position (e.g., FIGS. 4, 5, and 7) and a lowered holding position (e.g., FIGS. 6 and 8), as explained in further detail below. For example, the user can actuate the actuation mechanism 78 via user commands at the user input 66B.

In the cooking position, the cook top 62A is in a suitable position with respect to the housing 60 for cooking food. Generally speaking, a food container C1 such as a skillet (e.g., frying pan), griddle pan, or pot could be supported on the food container support surface 72A for cooking food therein. Desirably, when the cook top 62A is in the cooking position, the food container support surface 72A is at about the same elevation as the upper surface 60C of the housing 60 or higher than the upper surface of the housing. As used herein, the term about the same elevation as the upper surface of the housing means within the inclusive range of one inch higher than the elevation of the upper surface 60C of the housing 60 and one inch lower than the upper surface of the housing. Other ranges can be used without departing from the scope of the present invention. For example, the food container support surface 72A in the cooking position could be in the inclusive range of plus or minus about 0.75 inch, plus or minus about 0.50 inch, or plus or minus about 0.25 inch, etc. of the elevation of the upper surface 60C of the housing 60 without departing from the scope of the present invention. In the illustrated embodiment, the food container support surface 72A in the cooking position is generally flush (i.e., within an inclusive range of about plus or minus ⅛ inch) with the upper surface of the housing. Desirably, in the cooking position, a space circumscribing the peripheral edge of the food container support surface 72A is free of obstruction by the housing 60 such that handles of the food containers C1 are not obstructed from extending outboard of the food container support surface and the housing does not obstruct the food containers from being moved laterally. For example, a space extending outboard around the peripheral edge of the food container support surface 72A about 1 inch above the food container support surface is desirably free of obstruction by the housing 60.

Figure 6:
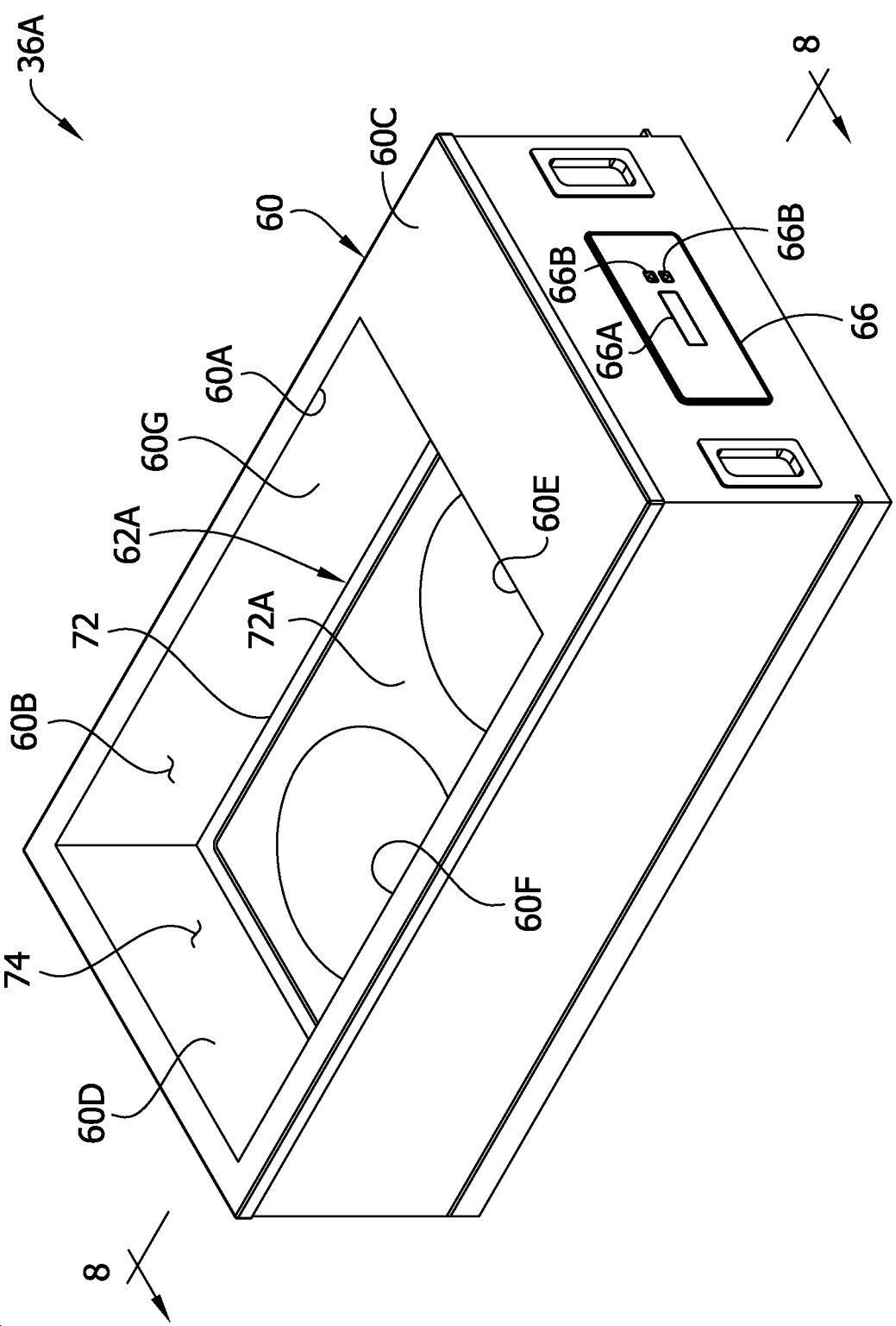
FIG. 6 is a rear perspective similar to FIG. 4 but showing a cook top of the appliance module lowered to a holding position for forming a holding well.
Figure 7:
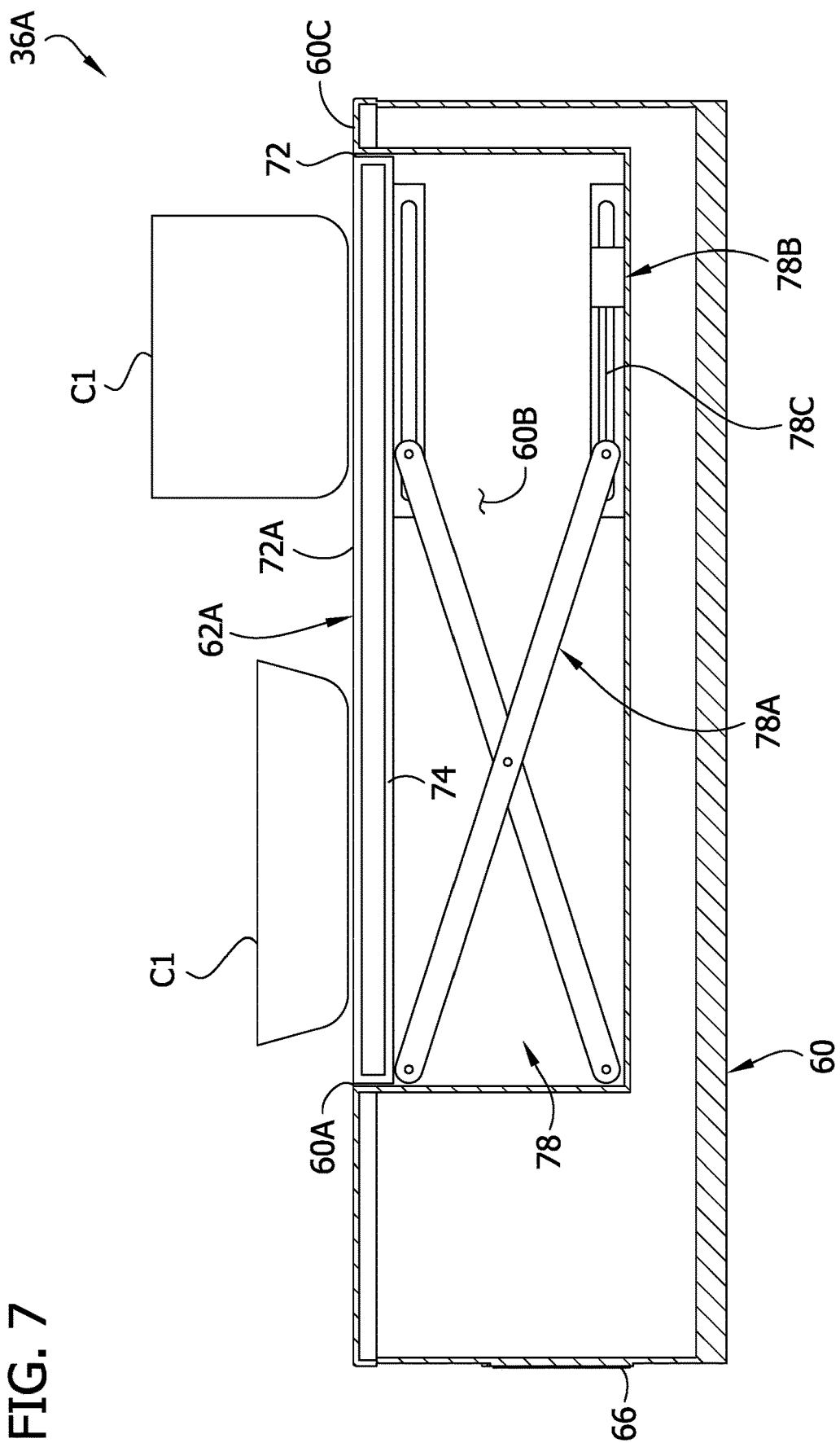
FIG. 7 is a schematic section of the appliance module taken in a plane including line 7-7 of FIG. 4.
Figure 8:
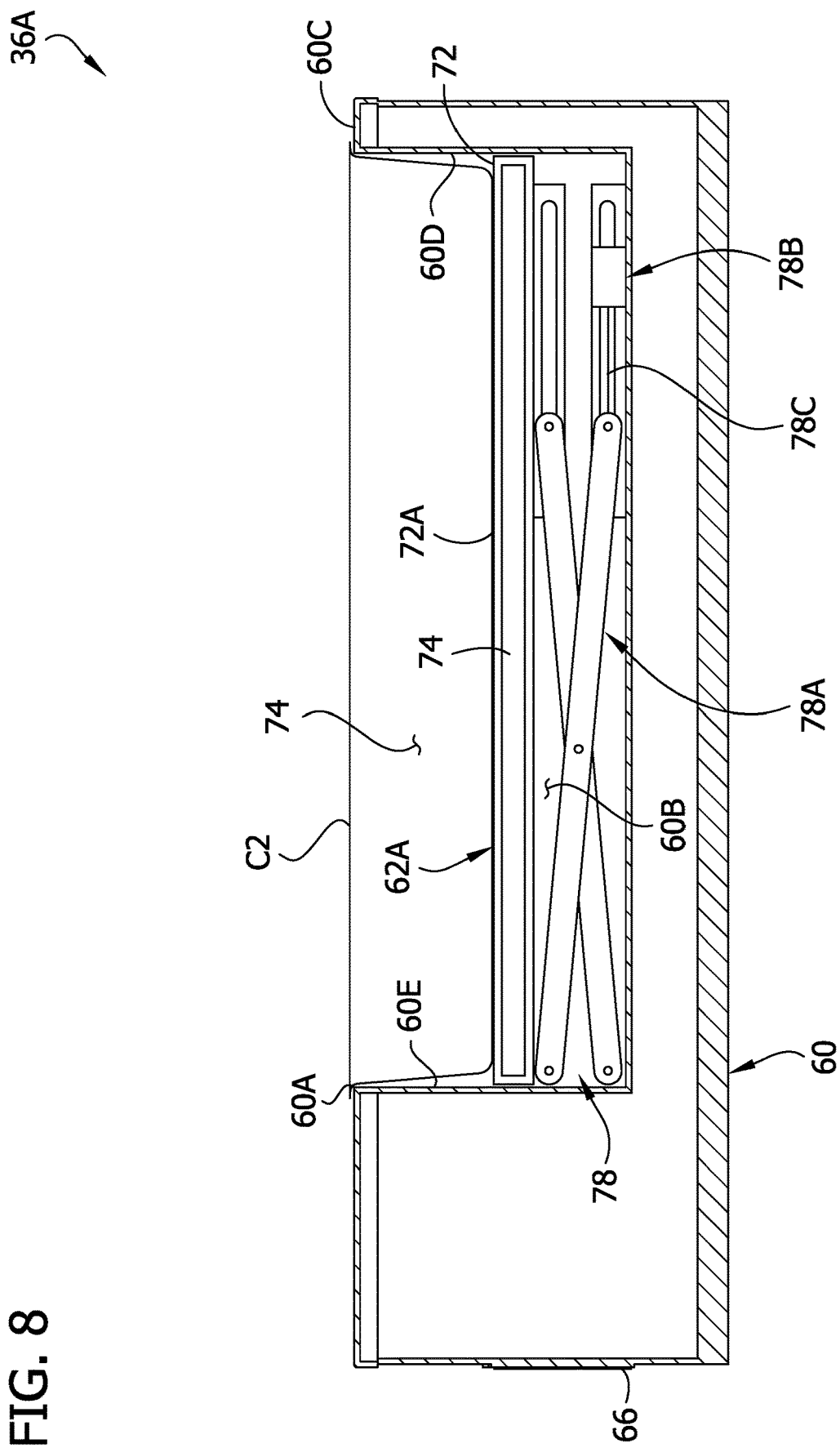
FIG. 8 is a schematic section of the appliance module taken in a plane including line 8-8 in FIG. 6.
Figure 9:
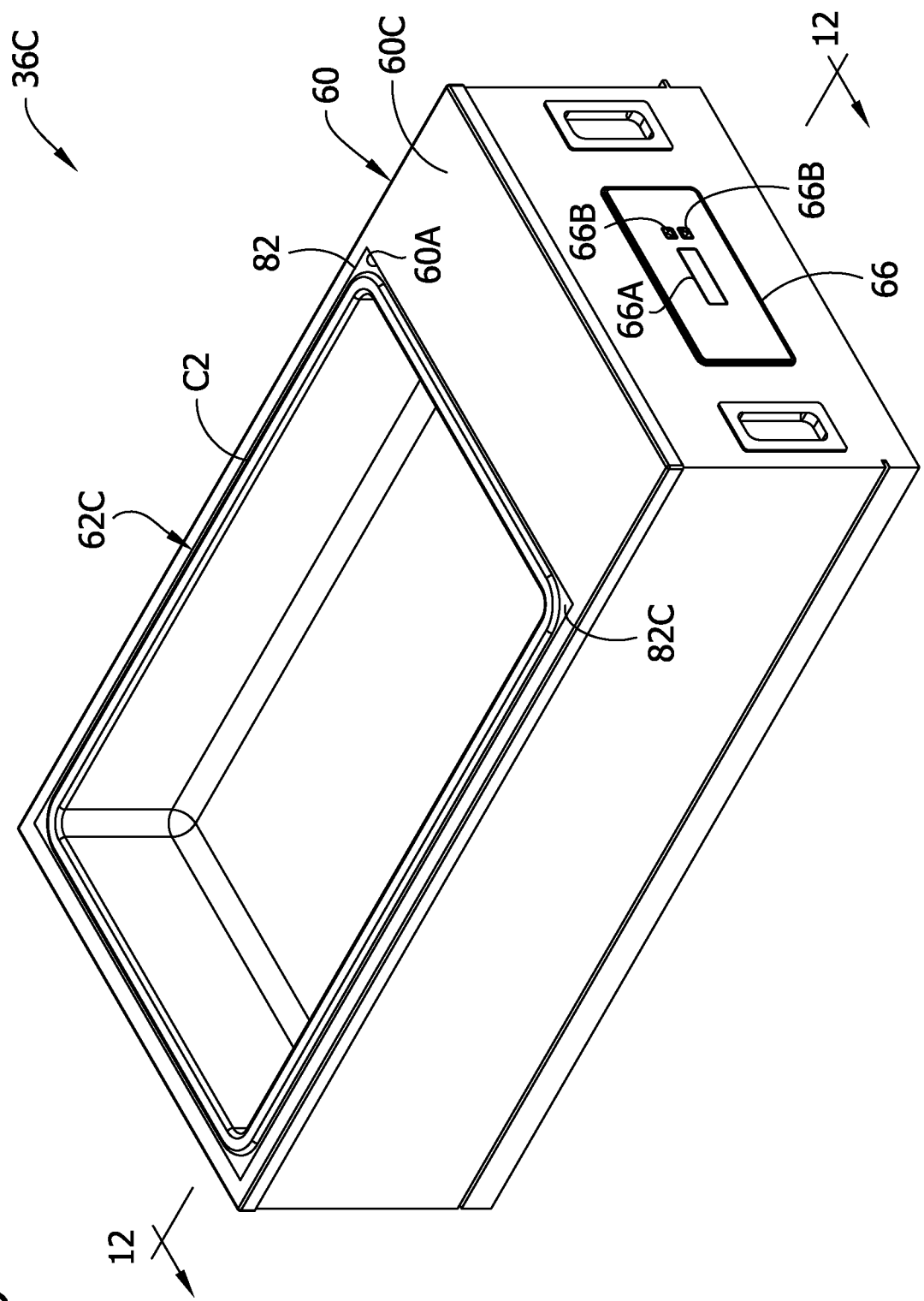
FIG. 9 is a rear perspective of a convertible holding appliance module.

In the food holding position, the food container support surface 72A is lower than the position of the food container support surface in the cooking position. In the holding position, the housing 60 and the food container support surface 72A form a receptacle defining a food container receiving space 74 below the upper surface 60C of the housing 60. The arrangement is such that a food container such as a rectangular pan C2 having a peripheral flange or rim can be dropped down into the food container receiving space 74 for holding food in the pan at a desired temperature. A bottom portion of the food container receiving space 74 is bounded by the food container support surface 72A, and front, rear, left, and right side portions of the food container receiving space are bounded by the housing 60. More specifically, as illustrated in FIG. 6, the food container support surface 72A forms the bottom wall of the receptacle, and inner upstanding forward, rear, left, and right walls 60D-60G of the housing 60 define respective the front, rear, left, and right side walls of the receptacle. The food container C2 is receivable through the opening 60A in the top wall of the housing into the food receiving space 74 of the receptacle. As shown in FIG. 8, the opening 60A is sized such that an edge margin of the upper surface 60C extending around the opening underlies the flange of the pan when the pan is received in the food container receiving space 74. For example, as illustrated, the flange of the pan C2 can rest on the peripheral edge and/or the bottom of the pan can rest on the food container support surface 72A.

It will be appreciated that the holding position shown in FIGS. 6 and 8 can be a first holding position intended for a pan C2 having a first height, and the cook top 62A can be moved and supported by the actuation mechanism 78 in various other holding positions corresponding to pans having other heights. For example, one such alternate holding position could locate the food container support surface 72A intermediate the cooking position and the holding position shown in FIGS. 7 and 8 for accommodating a pan having a shorter height.

As is now apparent, a user can selectively position the cook top 62A in the cooking position for cooking food and selectively position the cook top in the holding position for dropping a pan C2 of food down into the food container holding space 74 for holding the food in the pan at a desired holding temperature using the cook top. For example, a user can support a first container C1 on the food container support surface 72A and operate the cook top 62A in the cooking position for cooking food, and then lower the cook top to the holding position to hold food in a second container C2 in the food container receiving space 74 at a desired holding temperature by operating the cook top. Moreover, the holding position could be used for ambient holding. The appliance module 36A provides a holding configuration in which the open top of the pan C2 holding the food is at about the same elevation of the upper surface 60C of the housing 60 to provide the appearance of a traditional drop in holding pan. Other configurations can be used without departing from the scope of the present invention.

Referring now to FIGS. 9-13, the convertible holding appliance module 36C will be described in closer detail. Generally speaking, the appliance module 36C includes a housing 60, a food conditioning device in the form of a holding device 62C (e.g., holding well), a control 66, and multiple utility connectors 64. The housing 60 includes top, bottom, left, right, and front and rear walls defining an exterior of the housing. The control 66 is mounted on the rear wall of the housing. The control includes a user interface including a display 66A and a user input 66B. As shown in FIG. 10, a first utility connector 64A on the front wall of the housing 60 comprises a male plug for making a mating electrical power connection with a female electrical socket 48A of an appliance module dock 38. Second and third utility connectors 64A, 64B comprise male fluid connectors (e.g., inlet and outlet connectors) configured for mating connection with respective female fluid connectors 48A, 48B of an appliance module dock 38. Other types of utility connectors can be used without departing from the scope of the present invention.

The food holding device 62C is configured for holding food in a food container at a desired holding temperature. Desirably, the food holding device includes a receptacle 82 and at least one food conditioning element 84. In the illustrated embodiment, the food holding device 62C includes several food conditioning elements 84. The receptacle 82 includes a shell having inner and outer portions 82A, 82B defining an interior therebetween in which the food conditioning elements 84 are housed. The inner portion 82A of the shell defines a food container receiving space 86 sized and shaped for receiving a food container C2 such as a rectangular pan having a peripheral rim or flange. In particular, forward, rear, left, right, and lower exterior wall surfaces 90A-90E of the inner shell portion 82A bound respective front, rear, left, right, and bottom sides of the food container receiving space 86.

In the illustrated embodiment, multiple food conditioning elements 84 are provided for maintaining food at a desired holding temperature. Food conditioning elements 84 are provided at the bottom and at the front, back, left, and right sides of the food container receiving space 86. In particular, the food conditioning elements 84, shown schematically in FIGS. 12 and 13, include fluid coils 84A and electric heating elements 84B underlying the forward, rear, left, right, and lower exterior wall surfaces 90A-90E of the inner shell portion 82A. The coils 84A are operatively connected to the first and second fluid connectors 64B, 64C for routing temperature control fluid (e.g., refrigerant or glycol, etc.) through the coils for conditioning the food. For example, the coils 84A may be pillow plate coils. The electric heating elements 84B can be provided in addition to or instead of the coils 84A. For example the electric heating elements 84B can be electric resistance heating elements. Other types, numbers, and arrangements of food conditioning elements can be provided without departing from the scope of the present invention. Desirably, suitable insulation 92 backs the food conditioning elements 84 for increasing the effectiveness of the elements in maintaining a desired holding temperature of the food.

The holding appliance module 36C is convertible in the sense that the receptacle 82 can be configured in a position intended for the employee to view and access food held in the receptacle, or the receptacle can be configured in a position intended for customers to view and/or access food held in the receptacle. The receptacle 82 is positioned in a cavity 94 in the housing 60 and is movable in the cavity between a generally horizontal position (e.g., FIGS. 9, 10, and 12) and an inclined position (e.g., FIGS. 11 and 13). The upper wall of the housing 60 defines an upper surface 60C and has an opening 60A. The opening opens into the cavity 94 in the housing 60 in which the receptacle 82 is received. Desirably, in the generally horizontal position, a peripheral rim 82C of the receptacle 82 is at about the same elevation (i.e., in an inclusive range of plus or minus 1 inch) as the upper surface 60C of the housing 60. In the illustrated embodiment, the peripheral rim 82C of the receptacle 82 is generally flush (i.e., in an inclusive range of plus or minus ⅛ inch) with the upper surface 60C. For example, the generally horizontal position may be used when a person on the employee side 20A desires to have a holding location for himself to view and access (e.g., in preparing food products to serve to customers), and the inclined position can be used when the employee desires to provide customers with a holding location for them to view and/or access. The food conditioning elements 84 are carried by the receptacle 82 for movement with the receptacle between the generally horizontal position and the inclined position. The receptacle 82 in the inclined position has its rear end positioned higher than its opposite front end and higher than the upper surface 60C of the housing 60. For example, the receptacle 82 can be inclined at an angle in an inclusive range of about 15 degrees to about 40 degrees with respect to horizontal. When the receptacle 82 is in the inclined position, the front end of the receptacle is positioned at about the same elevation (i.e., in an inclusive range of plus or minus one inch) as the upper surface 60C of the housing 60. Other arrangements can be used without departing from the scope of the present invention.

The appliance module 36C includes a prop 98 configured for supporting the receptacle 82 in the inclined position. In the illustrated embodiment, the prop 98 comprises a linear actuator including an extendable and retractable support member 98A (FIG. 13) that not only supports the rear end of the receptacle 82 in the inclined position but can move the receptacle to the inclined position (e.g., via user commands at the user input 66B). The front end of the receptacle 82 is supported in the generally horizontal and inclined positions by a hinge 99 or other suitable support. The Other arrangements, types, and numbers of props can be used without departing from the scope of the present invention.

As is now apparent, the receptacle 82 can be moved between the generally horizontal position and the inclined position to meet the needs of the employee for a particular day or day part. In the generally horizontal position, the receptacle 82 is suited for holding a container C2 of food for the employee and/or customers to view and access. In the inclined position, the receptacle 82 is better suited for holding a container C2 of food for customers to view and/or access. In either case, the food conditioning elements 84 are capable of holding food in a food container in the receptacle at a desired holding temperature.

It will be appreciated that various aspects of the food preparation apparatus described herein can be modified without departing from the scope of the appended claims. For example, features may be omitted or have other forms without departing from the scope of the present invention. Moreover, it will be appreciated that the dimensions noted herein are provided by way of example without limitation.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

Applicant believes various ornamental features of apparatus and components thereof disclosed herein to be patentable and reserves the right to pursue design patent protection in a continuation or divisional application. For example, portions of the base, portions of one or more of the appliance modules, and/or portions of the breath guard, together in various combinations or and/or individually, having the dimensions shown or with indeterminate dimensions, are believed to be protectable. In one such combination, an exposed outer profile of one or more appliance modules with one or more portions of the base is believed to be patentable.

What is claimed is:

1. An appliance for holding food in a food container at a desired holding temperature, the appliance comprising:
   a housing, a receptacle operatively supported by the housing, the receptacle having a food container receiving space sized for receiving the food container, a lower portion of the food container receiving space and at least one side portion of the food container receiving space being bounded by the receptacle, the receptacle including at least one food conditioning element for holding food in the food container at a desired holding temperature when the food container is received in the food container receiving space,
   wherein the receptacle is movable with respect to the housing between a generally horizontal position and an inclined position for selectively holding the food container in the generally horizontal position and the inclined position, the receptacle in the inclined position having a first end positioned higher than an opposite second end, the at least one food conditioning element being movable with the receptacle between the generally horizontal position and the inclined position.

2. The appliance as set forth in claim 1, wherein the at least one food conditioning element is carried by the receptacle for movement with the receptacle to the inclined position.

3. The appliance as set forth in claim 2, wherein the receptacle includes a shell having an interior, and the at least one food conditioning element is housed in the interior of the shell.

4. The appliance as set forth in claim 1, wherein the receptacle is positioned in a cavity in the housing and movable in said cavity between said horizontal and inclined positions.

5. The appliance as set forth in claim 4, further comprising a prop configured for supporting the housing in the inclined position.

6. The appliance as set forth in claim 1, wherein the at least one food conditioning element is configured for cooling.

7. The appliance as set forth in claim 1, wherein the at least one food conditioning element is configured for heating.

8. The appliance as set forth in claim 1, wherein the at least one food conditioning element comprises a coil configured for routing temperature control fluid through the coil for holding the food in the food container at the desired holding temperature.

9. The appliance as set forth in claim 8, wherein the coil is positioned in a side of the receptacle for temperature conditioning a side of the food container receiving space.

10. The appliance as set forth in claim 9, wherein the coil is a first coil and the at least one food conditioning element comprises a second coil in a bottom of the receptacle for temperature conditioning a bottom of the food container receiving space.

11. The appliance as set forth in claim 10, wherein the second coil underlies a bottom wall of the receptacle.

12. The appliance as set forth in claim 1, wherein the housing has an upper surface, and wherein the first end of the receptacle is higher than the upper surface of the housing when the receptacle is in the inclined position.

13. The appliance as set forth in claim 12, wherein the second end of the receptacle opposite the first end is positioned at about the same elevation as the upper surface of the housing when the receptacle is in the inclined position.

14. The appliance as set forth in claim 13, wherein the second end of the receptacle opposite the first end is positioned at about the same elevation as the upper surface of the housing when the receptacle is in the horizontal position.

15. The appliance as set forth in claim 12, wherein the housing includes an upper wall defining the upper surface, the upper wall having an opening in which the receptacle is received in the inclined position.

16. The appliance as set forth in claim 1, wherein the at least one food conditioning element comprises a first food conditioning element underlying a bottom of the food container receiving space and a second food conditioning element at a side of the food container receiving space.

17. The appliance as set forth in claim 1, further comprising a user interface having a display, the display being positioned on the housing toward a first end of the housing, the receptacle in the inclined position inclining upward in a direction toward said first end of the housing.

18. The appliance as set forth in claim 1, wherein the second end of the receptacle opposite the first end is positioned at about the same elevation in the horizontal position and the inclined position.

19. The appliance as set forth in claim 1, further comprising a hinge coupling the receptacle to the housing.

* * * * *